(12) United States Patent
Eppehimer et al.

(10) Patent No.: US 11,832,627 B2
(45) Date of Patent: Dec. 5, 2023

(54) MARINATOR APPARATUS

(71) Applicant: AyrKing Corporation, Jeffersontown, KY (US)

(72) Inventors: William Samuel Eppehimer, Louisville, KY (US); James D. Bell, Prospect, KY (US)

(73) Assignee: AyrKing Corporation, Jeffersontown, KY (US)

( * ) Notice: Subject to any disclaimer, the term of this patent is extended or adjusted under 35 U.S.C. 154(b) by 648 days.

(21) Appl. No.: 17/026,184

(22) Filed: Sep. 19, 2020

(65) Prior Publication Data

US 2021/0084918 A1 Mar. 25, 2021

Related U.S. Application Data

(60) Provisional application No. 62/902,597, filed on Sep. 19, 2019.

(51) Int. Cl.
| | |
|---|---|
| *A23B 4/26* | (2006.01) |
| *A22C 21/00* | (2006.01) |
| *A23L 13/50* | (2016.01) |
| *A23L 13/72* | (2023.01) |

(52) U.S. Cl.
CPC .............. *A23B 4/26* (2013.01); *A22C 21/00* (2013.01); *A23L 13/57* (2016.08); *A23L 13/72* (2016.08); *A23V 2002/00* (2013.01)

(58) Field of Classification Search
CPC .......... A23B 4/26; A23L 13/72; A22C 21/00; A23V 2002/00
USPC .......................................................... 99/535
See application file for complete search history.

(56) References Cited

U.S. PATENT DOCUMENTS

| | | | | |
|---|---|---|---|---|
| 3,928,634 A | * | 12/1975 | Gasbarro | A23L 13/72 426/652 |
| 4,169,409 A | * | 10/1979 | Haubner | A23B 4/26 99/629 |
| 4,409,704 A | * | 10/1983 | Seiffhart | B01F 29/62 452/141 |
| 4,446,779 A | * | 5/1984 | Hubbard | B01F 29/20 366/144 |
| 4,657,771 A | * | 4/1987 | Gould | B01F 29/63 426/641 |
| 5,543,163 A | * | 8/1996 | Groves | A23B 4/16 426/232 |
| 6,007,418 A | * | 12/1999 | Suhner | A23B 4/26 452/141 |
| 6,015,580 A | * | 1/2000 | Mays | A23L 13/72 426/442 |

(Continued)

*Primary Examiner* — Eric S Stapleton
(74) *Attorney, Agent, or Firm* — Maginot, Moore & Beck LLP

(57) ABSTRACT

A marinator apparatus for the preparation of pieces of a whole chicken includes a fluid-tight hollow drum with opposing top and bottom walls that are substantially planar and that include an opening with a lid configured to sealingly close the opening. The drum further includes an interior baffle fixed inside that separates the drum into a top compartment accessible only through the top opening and an opposite bottom compartment accessible only through the bottom opening. The drum is supported for rotation by a support axle projecting from one end wall and a drive axle projecting from the opposite end wall. The drive axle includes a driven gear configure to be driven by a powered drive gear.

15 Claims, 7 Drawing Sheets

(56) References Cited

U.S. PATENT DOCUMENTS

| | | | |
|---|---|---|---|
| 6,040,013 A * | 3/2000 | Karales | A23B 4/26 366/139 |
| 2002/0023549 A1 * | 2/2002 | Thornton | A23L 13/72 99/535 |
| 2003/0180439 A1 * | 9/2003 | Paterson | A23L 13/43 426/641 |
| 2004/0067286 A1 * | 4/2004 | Groves | A23B 4/023 426/231 |
| 2006/0110509 A1 * | 5/2006 | Thornton | A23B 4/20 426/472 |
| 2007/0275163 A1 * | 11/2007 | Dunaitschik | A23G 3/26 118/19 |
| 2008/0050482 A1 * | 2/2008 | Fereghetti | A23L 5/00 426/281 |
| 2008/0241269 A1 * | 10/2008 | Velasquez | A23L 3/3589 424/520 |
| 2012/0006669 A1 * | 1/2012 | Bronshtein | F23G 5/0276 202/100 |
| 2012/0225173 A1 * | 9/2012 | Larson | A22C 17/0026 99/485 |
| 2013/0253700 A1 * | 9/2013 | Carson | G16H 20/13 700/236 |
| 2014/0033446 A1 * | 2/2014 | Vander Zwaag | D06F 37/10 8/137 |

* cited by examiner

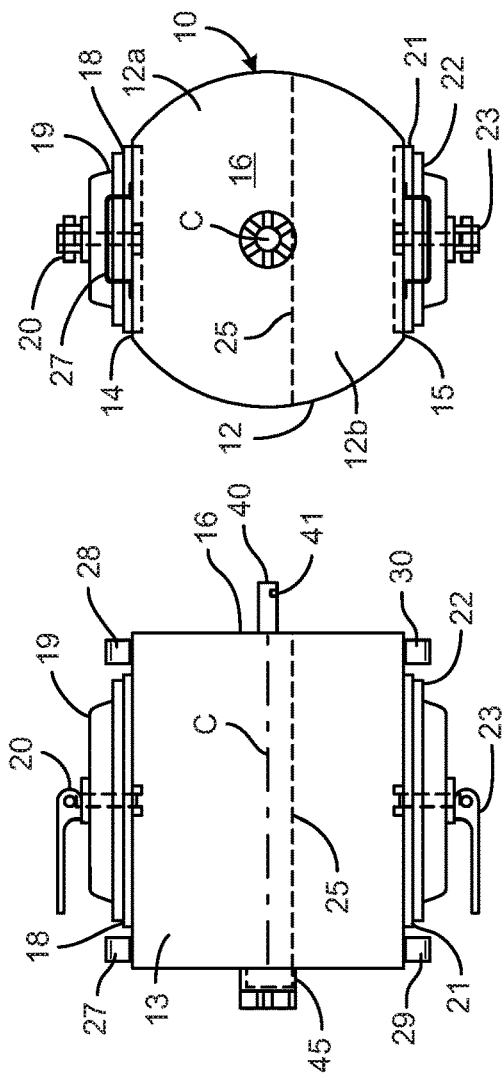
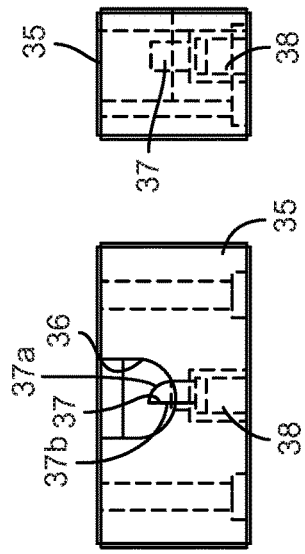
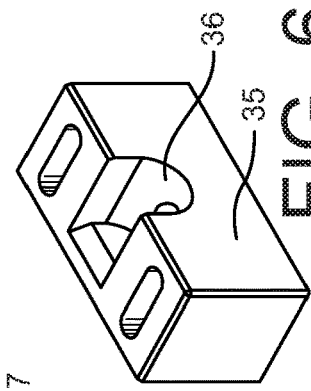
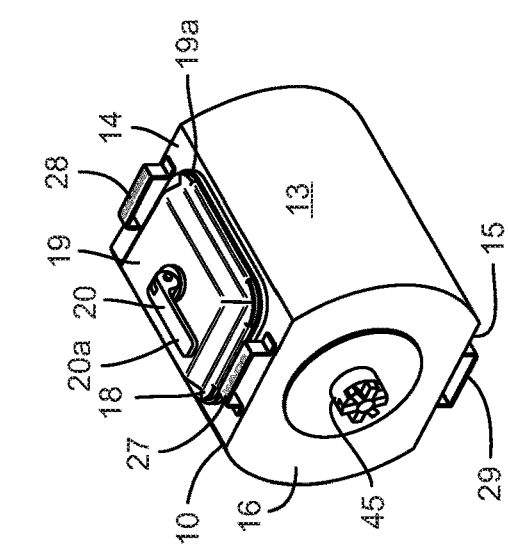
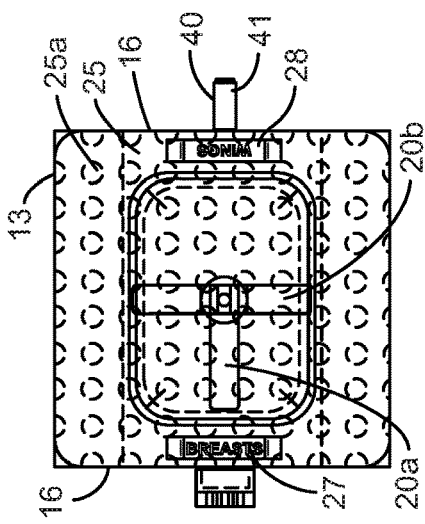

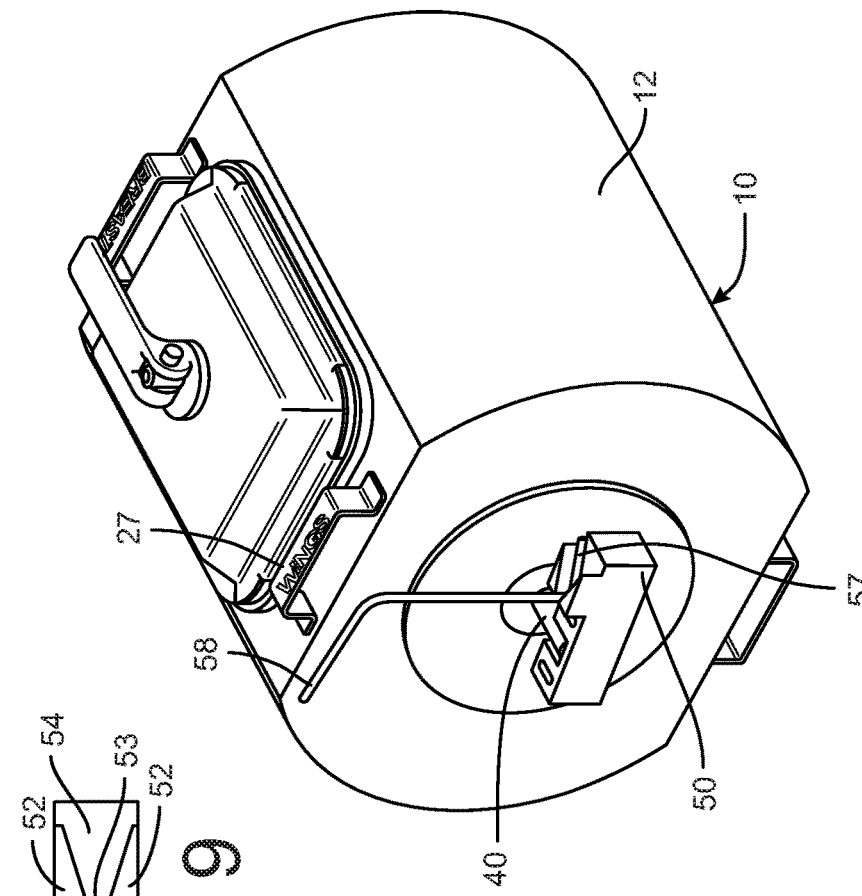
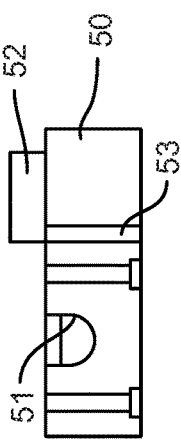
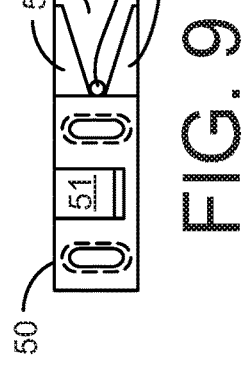
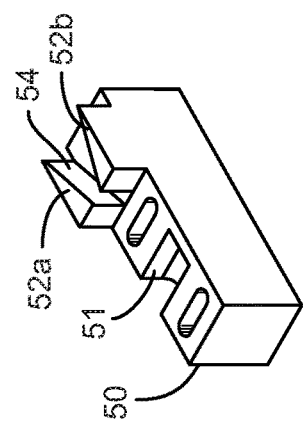
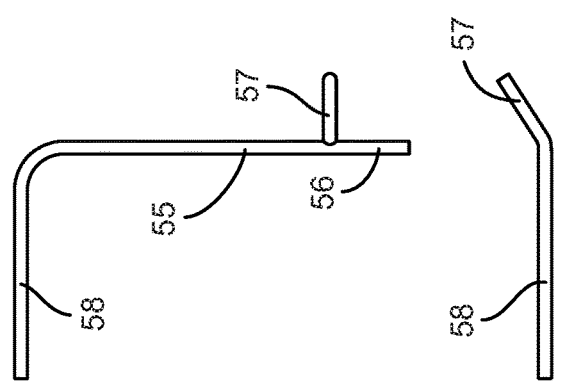
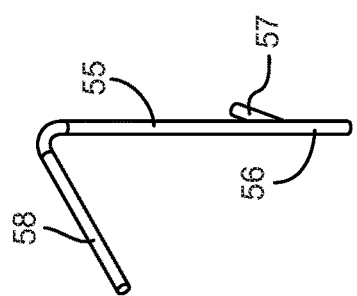

MARINATOR APPARATUS

PRIORITY CLAIM

This application is a utility filing from and claims priority to U.S. application Ser. No. 62/902,597, filed on Sep. 19, 2019, the entire disclosure of which is incorporated herein by reference.

BACKGROUND

Commercial restaurants, particularly "fast food" restaurants, often provide prepared chicken that is roasted or fried. Prior to cooking the chicken is marinated in various concoctions to add the restaurant's trademark flavor to the chicken. In a typical fast-food restaurant, hundreds of chicken pieces—breast, wing, thigh and leg—are prepared and cooked every day to meet the seemingly insatiable demand of the hungry public. In a typical process, a whole chicken is separated into its pieces and then marinated. Once marination is complete the pieces are cooked, after which the cooked pieces must be separated into groups of like pieces (leg, wing, thigh and breast) for sale to the customer. In another process, the pieces of the whole chicken are placed in piece-specific bins, with each bin marinated separately.

A typical marination process occurs in a rotating drum where the chicken pieces tumble within a marination composition. The pieces are often tumbled for 20-30 minutes in order to ensure that the pieces are fully coated with the marination composition.

In the typical chicken preparation process, separating the pieces of the whole chicken is a time-consuming aspect of the process. Separating the pieces ultimately slows down the overall process of preparing chicken for consumption by the restaurant customers. Therefore, there is a need for an apparatus and method that reduces this time-consuming aspect of the food preparation process.

SUMMARY OF THE DISCLOSURE

A marinator apparatus comprises a fluid-tight hollow drum, elongated along a longitudinal axis and including opposing top and bottom walls that are substantially planar, a shell between the top and bottom walls that is substantially circular, and opposite end walls. A top opening is defined in the top wall having a top lid configured to sealingly close the top opening, the top opening sized to permit introduction of a food item to be treated within the drum. A bottom opening is defined in the bottom wall having a bottom lid configured to sealingly close the bottom opening, the bottom opening sized to permit introduction of a food item to be treated within the drum.

The drum further includes an interior baffle fixed inside the hollow drum between the top and bottom walls to define a top compartment accessible only through the top opening and an opposite bottom compartment accessible only through the bottom opening. The drum is rotatably supported by a support axle fixed to and projecting from one of the opposite end walls colinear with the longitudinal axis of the drum, and by a drive axle fixed to and projecting from the other of the opposite end walls colinear with the longitudinal axis of the drum. The drive axle is configured to be rotatably driven by a source of rotational power. In some embodiments, the drive axle can include a driven gear configure to be driven by a powered drive gear.

In one aspect, the support axle can be supported for rotation in the channel of a support block. The support block can be provided with a component to prevent rotation of the support axle, and therefor the drum. The component can prevent rotation of the drum in one direction and permit rotation in the opposite direction.

In another aspect, the baffle can include openings communicating between the two compartments so that a food preparation composition introduced into one compartment can be applied to the food pieces in both compartments. The baffle can be angled toward the end of the drum with the support axle.

DESCRIPTION OF THE DRAWINGS

FIG. 1 is perspective view of a marination drum according to one aspect of the present disclosure.

FIG. 2 is a side view of the marination drum shown in FIG. 1.

FIG. 3 is an end view of the marination drum shown in FIG. 1.

FIG. 4 is a top view of the marination drum shown in FIG. 1.

FIG. 5 is detail view of the marination drum shown in FIG. 1.

FIG. 6 is a perspective view of a mounting block for use with the marination drum shown in FIG. 1.

FIG. 7 shows side, end and top views of the mounting block shown in FIG. 6.

FIG. 8 is a perspective view of another mounting block for use with the marination drum shown in FIG. 1.

FIG. 9 shows side, end and top views of the mounting block shown in FIG. 8.

FIG. 10 is a perspective view of a rod for use with the mounting block of FIG. 8 and marination drum of FIG. 1.

FIG. 11 show side, end and top views of the rod shown in FIG. 10.

FIG. 12 is a perspective view of the drum of FIG. 1 in use with the mounting block of FIG. 8.

DETAILED DESCRIPTION

Figure 13:
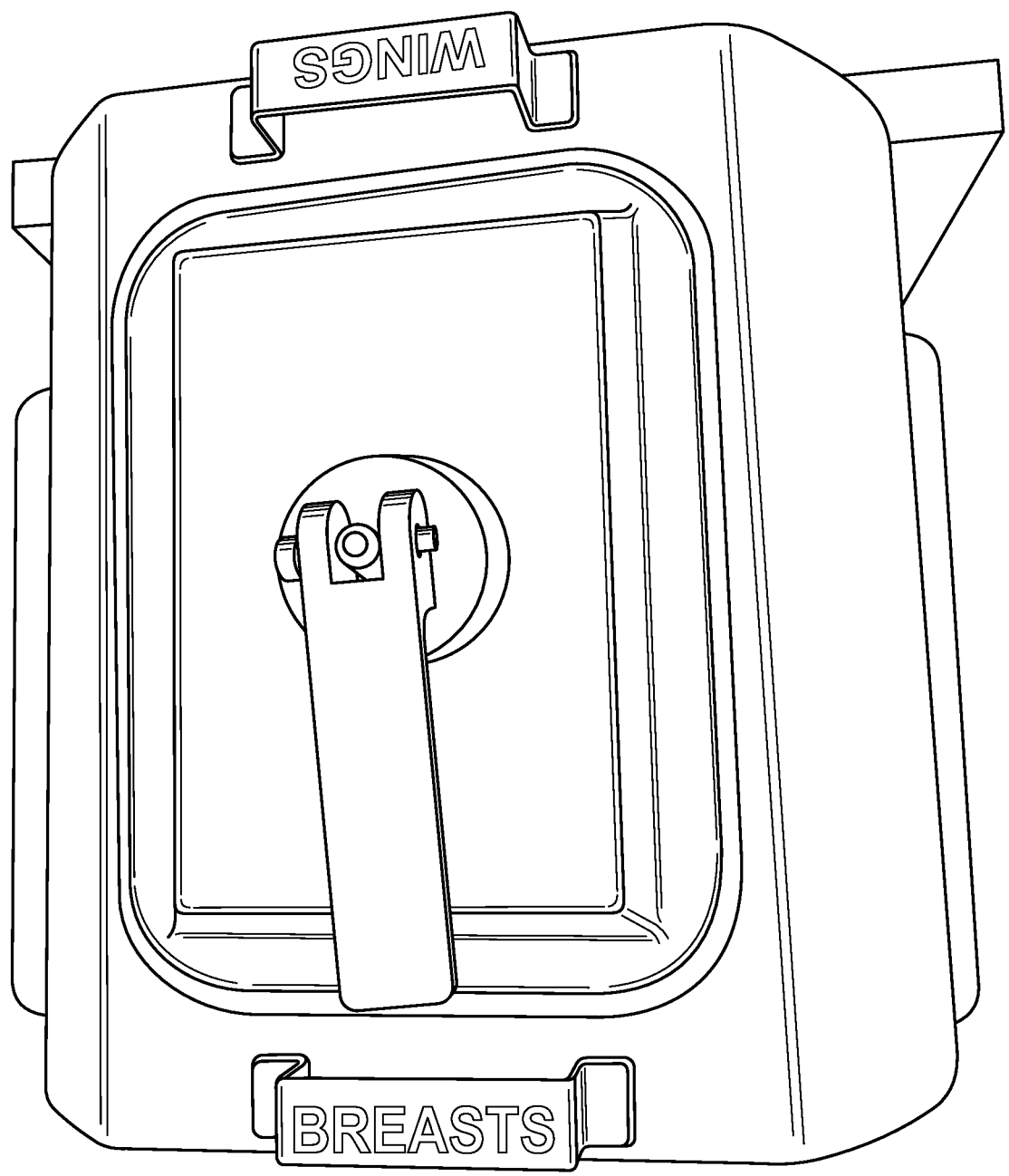
FIG. 13 is a top view of the drum shown in FIG. 1 with the drum in a first position to receive chicken pieces.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains A marinator apparatus 10 according to one aspect of the present disclosure is shown in FIGS. 1-5. The marinator apparatus includes a fluid-tight hollow drum 12 configured to receive chicken pieces and marination ingredients, and adapted to be rotated by a separate power source, such as a rotary motor. In one embodiment, the motor can be a 90-watt AC motor with a rated speed of 1600 rpm. The drum 12 is formed by a shell 13, opposing top and bottom walls 14 and 15, and opposite end walls 16, all combined to define an open interior for receiving the chicken pieces. The drum 12 is elongated, as best seen in FIG. 2, and the shell 13 is circular between the flat or planar top and bottom walls, as shown in FIG. 3. This mixture of circular and planar interior surfaces facilitates the tumbling of the chicken pieces contained within the drum. The drum is sized to hold a substantial quantity of chicken pieces for use in a commercial restaurant setting. Thus, in one embodiment the drum is about 17 inches long and 15 inches in diameter.

The top wall 14 defines an opening 18 that is sized to allow an operator to easily place chicken pieces within the drum. A top lid 19 is provided that includes a seal 19a to provide a fluid-tight seal when the lid is engaged to the opening. A locking mechanism 20 is provided that allows the top lid to be removed from the opening and that seals the lid tightly to the top wall at the opening 18. In one embodiment, the locking mechanism includes a handle 20a that is accessible outside the drum 12 and that is rotatably mounted on the lid 19. The handle rotates a pair of lateral arms 20b that engage the inside of the top wall 14 to clamp the lid to the top wall, as depicted in FIG. 4. The arms are configured so that they can be rotated 90° from the position shown in FIG. 4 to disengage the top wall and allow complete removal of the top lid 19 from the opening 18.

The bottom wall 15 of the drum 12 also defines an opening 21 identical to the top opening. The bottom opening is provided with a bottom lid 22 and locking mechanism 23 that is identical to the top lid 19 and mechanism 20. It can thus be appreciated that chicken pieces can be loaded into the drum 12 through either opening 18, 21, and that the drum can be completely closed when both lids 19, 22 are engaged to the respective top and bottom walls 14, 15.

Figure 16:
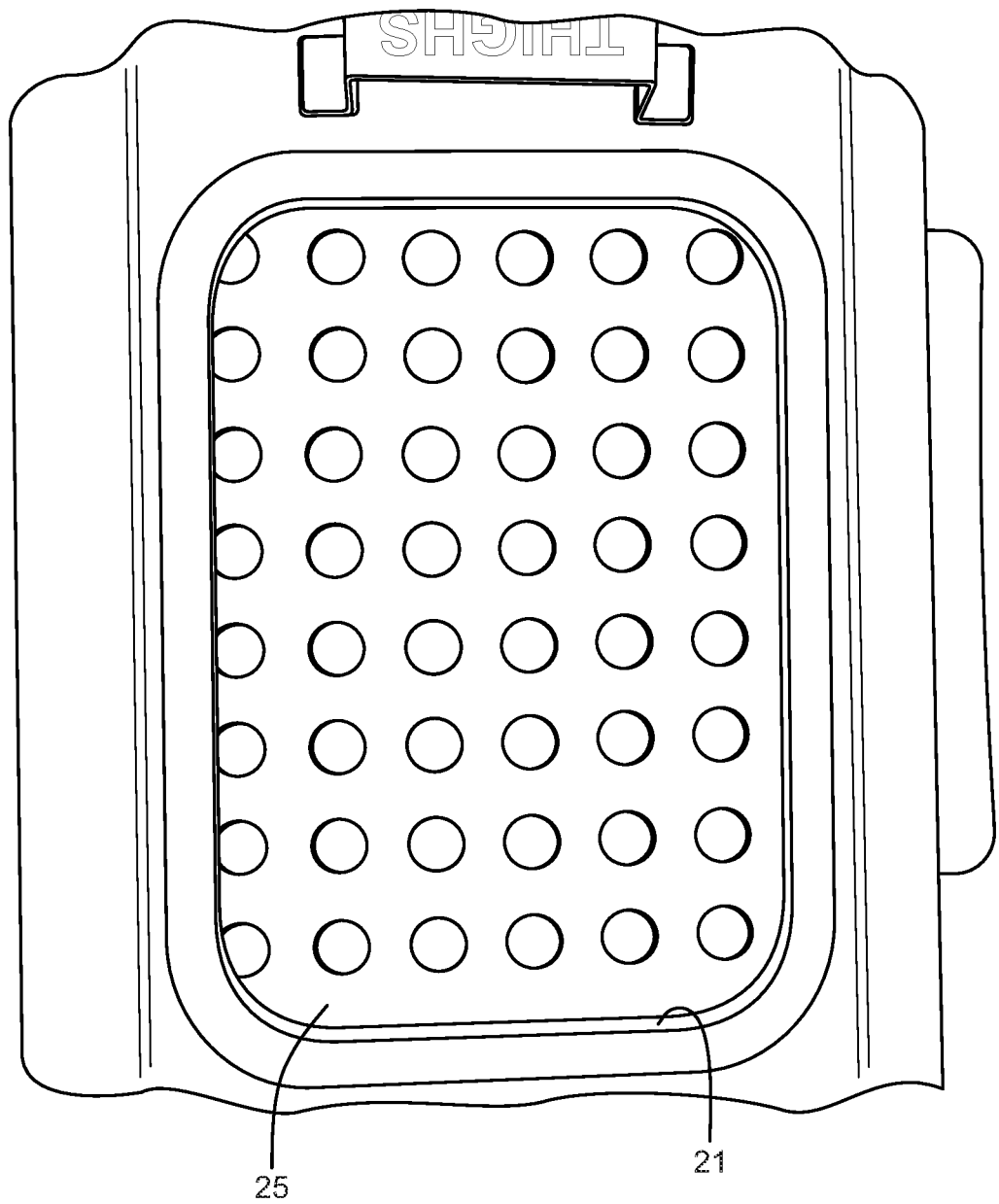
FIG. 16 is a top view into the interior of the drum shown in FIG. 13.
Figure 17:
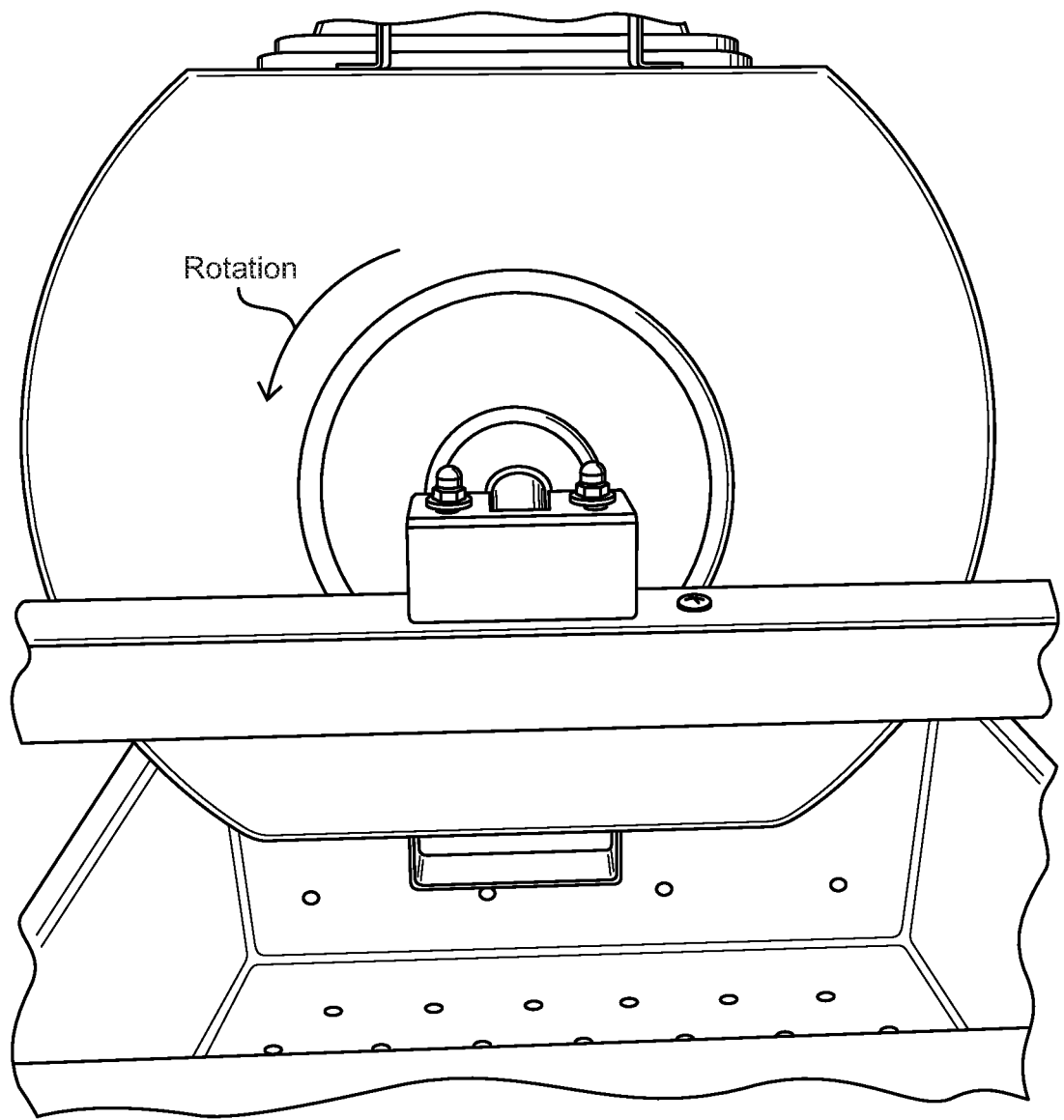
FIG. 17 is an end view of the marinator apparatus shown in FIG. 13 indicating the permitted direction of rotation of the drum during the marination process.

In one aspect of the present disclosure, the drum 12 is divided into two compartments by an interior baffle 25, as shown in FIGS. 3 and 4. The baffle is thus arranged parallel to the top and bottom walls 14, 15 to divide the drum into an upper compartment 12a and lower compartment 12b. The baffle includes a plurality of apertures 25a to permit communication of the marination ingredients between the two compartments, as shown in FIG. 16. As best seen in FIGS. 2 and 3, the baffle 25 is situated below the center longitudinal axis C of the drum 12—i.e., closer to the bottom wall 15 than to the top wall 14. In one specific embodiment, the baffle 25 is offset about 5 inches above the bottom wall 15 and about 7 inches below the top wall 14. The purpose of this offset is explained below in connection with the support blocks for supporting the drum 12 during use. In an alternative embodiment, the baffle can be solid—i.e., without the apertures—so that the two compartments are self-contained. This baffle arrangement can be used where the marination ingredients are different between the chicken pieces in two compartments.

Figure 14:
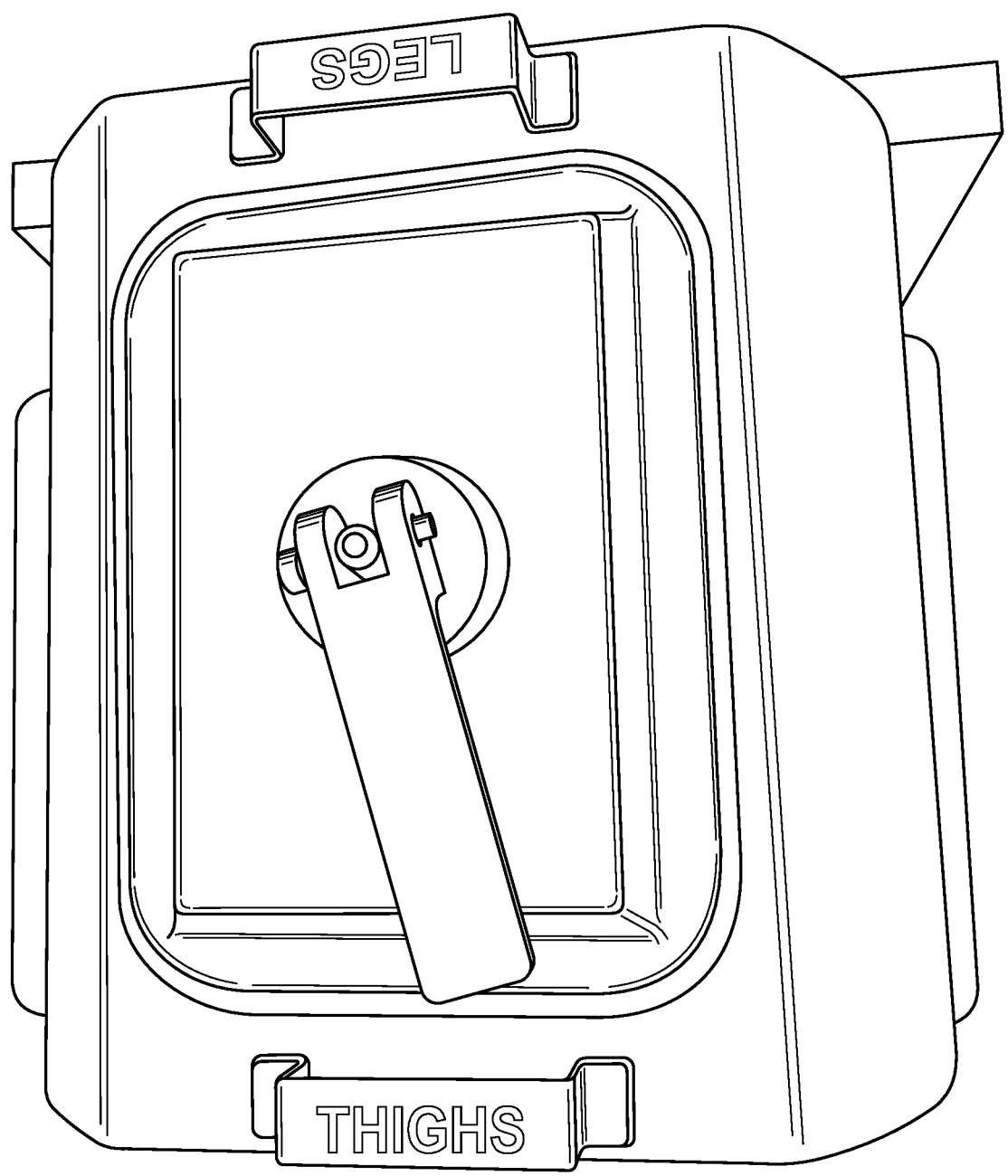
FIG. 14 is a view of the drum shown in FIG. 13, with the drum rotated 180° to a second position to receive chicken pieces.

The drum 12 of the marinator apparatus 10 includes a pair of handles on each of the top and bottom walls. In particular, the top wall 14 includes handles 27, 28 at opposite ends of the drum, while the bottom wall 15 includes similarly situated handles 29, 30. The handles are sized to be manually grasped to allow the operator to move the drum to and from supports, as described below. As shown in the detail view of FIG. 5, the handles can include words to identify the chicken pieces to be received in the particular top and bottom openings 18, 21. In one specific embodiment, the handles 27, 28 on the top wall 14 can be labeled "BREASTS" and "WINGS", as shown in FIG. 13, to indicate that the breast and wing pieces of the chicken are to be placed within the upper compartment 12a. The lower handles 29, 30 can be labeled "LEGS" and "THIGHS", as shown in FIG. 14, to indicate that the leg and thigh pieces of the chicken are to be placed in the lower compartment 12b.

The drum 12 of the marinator apparatus 10 includes a support axle 40 projecting from one end wall 16, and a drive axle 45 projecting from the opposite end wall, each axle colinearly disposed along the center longitudinal axis C of the drum. The drive axle is configured to be rotatably driven by a source of rotational power. In one embodiment, the drive axle 45 can include a driven gear 46, as shown in the detail view of FIG. 5 that is adapted to mesh with a drive gear of a power source, such as the electric motor discussed above. Although not shown in the figures, the power source or motor can be integrated into a support block that is configured to rotatably support the drive axle 45 and driven gear 46. The driven axle 45 is fixed to the drum 12 so that the drum rotates with the driven axle as the axle is driven by the motor. The motor and driven axle thus rotate the drum to tumble the chicken pieces with the marination mixture within the interior of the drum, as described above. It is understood that the driven gear 46 can be configured to be rotationally driven by another source of rotational power, such as a pulley or a vane motor. It is also understood that the driven gear can be eliminated and the drive axle 45 can be incorporated as the drive shaft or armature of an electric motor.

Figure 15:
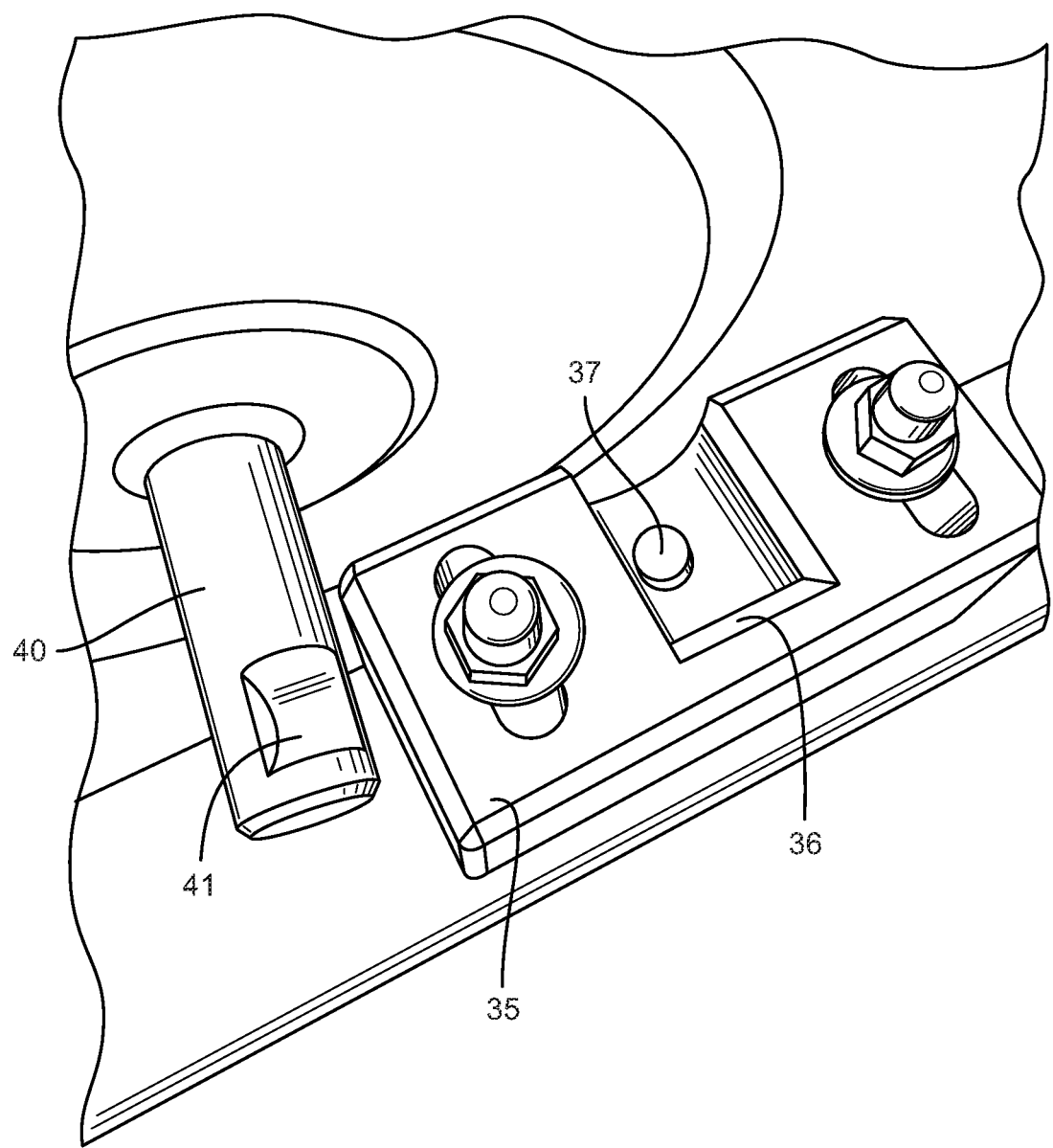
FIG. 15 is an enlarged view of the support axle and support block of the marinator apparatus of the present disclosure.

The support axle 40 is also fixed to the end wall 16 of the drum. The support axle 40 is supported by a support block 35, shown in FIGS. 6, 7 and 15. The block defines a channel 36 for receiving the support axle 40. The block can be formed of a resilient low-friction material so that the block can operate as a bearing for rotation of the support axle 40. In specific embodiments, the block can be formed of a plastic, such as PTFE (polytetrafluoroethylene) or UHMW-PE (ultra-high molecular weight polyethylene). In one feature, the support block 35 includes a pin 37 that is biased by a spring 38 to project into the channel 36. The pin is sized to be received within a notch 41 defined in the support axle 40. When the pin is in its biased position it engages the notch 41 of the support axle 40 to prevent the axle from rotating relative to the mounting block. This in turn prevents the drum 12 from rotating. The pin and notch arrangement provides a valuable feature for the drum 12 of the marinator apparatus 10 as described herein.

As noted above, the drum incorporates two compartments 12a, 12b, with each compartment intended to receive only certain chicken pieces—breasts and wings in one compartment and legs and thighs in the other compartment. This feature allows the operator to simplify the chicken piece sorting process relative to the process described above. In particular, the operator can sort a quantity of whole chickens to place specific pieces, such as breasts and wings, directly into one of the compartments of the drum. Once that compartment is filled as desired, the operator can rotate the drum so that the lid and opening of the other compartment is accessible. The remaining chicken pieces can be introduced directly into this second compartment. The pin and notch feature of the support axle 40 and support block 35 holds the drum in position with the top opening 18 facing upward to receive the first complement of chicken pieces into the first compartment 12a. When that compartment is filled as desired, and the lid is closed, the pin 37 can be retracted to allow the drum to be rotated so that the bottom opening 21 is facing upward to receive the second complement of chicken pieces into the second compartment 12b.

In one embodiment, the pin 37 includes an arcuate lateral surface 37a that can be contacted by one side of the notch 41 of the support axle 40 when the drum is rotated in a particular direction. Specifically, the direction of rotation corresponds to the direction of rotation of the drum when driven by the motor. Rotation in the opposite direction is prevented by the flat face 37b of the pin. The pin thus provides a mechanism for holding the drum in position to allow the operator to fill the upper compartment 12a with chicken pieces, then for allowing the drum to be rotated to allow the second compartment 12b to be filled with chicken pieces. It is noted that when the upper compartment is filled with chicken pieces, the pieces act as a ballast for holding the drum with the second opening 21 facing upward to receive the remaining complement of chicken pieces. It can be noted that having the baffle 25 offset toward the bottom wall 15 limits the amount of food pieces that can be introduced into the second compartment 12b so that the weight of the food pieces in the upward-facing lower compartment cannot overcome the ballast provided by the food pieces in the downward-facing upper compartment. It can be appreciated that another notch on the opposite side of the support axle is not required in order to prevent the drum from rotating since the weight of the first complement of chicken pieces will prevent inadvertent rotation of the drum until the drum is deliberately rotated by the operator or by activation of the motor and driven axle 45. However, as an alternative, a second notch can be provided in the support axle to be engaged by the pin 37.

In one specific embodiment, the interior baffle 25 can be angled downward toward the end wall of the drum that includes the support axle. This feature causes the chicken pieces introduced into the first compartment 12a to collect toward the support axle end of the drum, thereby shifting the weight of the chicken to a position that helps keep the support axle in engagement with the pin 37 as the chicken pieces are loaded into the drum.

In use, the marinator apparatus 10 is positioned adjacent a table where whole chickens are separated into the particular pieces—thigh, wing, leg and breast. The drum is positioned with the top lid 19 facing upward so that the pin 37 is locked into the notch 41 of the support axle. This holds the drum 12 in this particular orientation and prevents the drum from being inadvertently rotated as chicken pieces are fed into the top opening 18. With the drum properly positioned, the lid is removed, leaving the top opening 18 ready to receive chicken pieces. The operator can begin separating the specific pieces from the whole chickens, placing the specific pieces (breasts and wings) directly into the open drum. The other pieces (legs and thighs) can remain in the pan containing the whole chickens or can be placed in a separate pan. Once the upper compartment 12a of the drum is filled as desired, a food preparation composition, such as a marinade or a seasoning pack, can be introduced through the top opening. The top lid 19 is mounted on the opening and locked in place by the locking mechanism 20.

The drum is then manually rotated in the permitted direction, which depresses the spring-biased pin 37 to dislodge the pin from the notch 41 in the support axle 40. The drum is rotated 180° so that the bottom lid 22 is now facing upward. The lid 22 is removed, leaving the second opening 21 ready to receive the other chicken pieces (legs and thighs) into the second compartment 12b. Once that compartment is filled as desired, additional food preparation composition, such as marinade or seasoning, can be introduced through the second opening 21. The second lid 22 is then engaged on the opening and locked in place by the second locking mechanism 23. The drum is now sealed with all of the chicken pieces and marination composition contained within the drum. The motor (not shown) can be activated to rotate the drum to tumble the chicken pieces, mix the marination composition and ensure that the pieces are uniformly coated. Once the tumbling process is complete (such as after 2-5 minutes of rotation), the chicken pieces can be retrieved from the respective compartments and placed in piece-specific pans. Since two types of pieces are stored in each compartment, a final sorting process must occur. However, the process is greatly simplified than in the prior sorting process. The process can be simplified even further by judicious selection of the pieces to be contained in a common compartment.

The mounting block 35 and spring-biased pin 37 arrangement described above holds the drum 12 against rotation as the operator loads the drum with chicken pieces through the top opening 18. This arrangement allows the operator to turn the drum over for access to the bottom opening 21. In addition, this arrangement allows the drum to be continuously rotated by the drive motor during the marination process. An alternative approach to holding the drum 12 in position is depicted in FIGS. 8-12. A support block 50 defines a channel 51 for seating the support axle 40 of the drum, as in the prior embodiment. The support block also includes a pair of opposing retainer walls 52a, 52b that define a wedge-shaped channel 54. A bore 53 is defined at the apex of the wedge-shaped channel 54. An L-shaped rod 55 is provided that is mounted within the bore 53, as shown in FIG. 12. The rod 55 includes a base 56 that seats within the bore and a leg 57, projecting generally perpendicularly from the base, that is situated within the wedge-shaped channel 54. It can be appreciated that the rod is free to pivot within the bore 53 so that the leg 57 can contact either of the opposite walls 52a, 52b.

The top of the rod 55 forms an arm 58 that extends generally perpendicularly from the end of the rod base 56. As seen in FIG. 11, the arm 58 is significantly longer than the leg 57. In particular, the arm 58 has a length so that the arm can be disposed within one of the handles, such as handle 27, of the drum 12, as shown in FIG. 12. In this position, the arm 58 prevents the drum 12 from rotating about its axles. The leg 57 is in contact with the outer wall 52b when the arm 58 is in its rotation locking position. When it is desired to rotate the drum, the rod 55 can be pivoted about the bore 53 until the leg 57 contacts the inner wall 52a, so that the arm 58 is free of the handle 27.

It can be appreciated that the marinator apparatus 10 of the present disclosure simplifies and streamlines the process of preparing chicken pieces in a high through-put restaurant. The drum 12 includes clear labels on the handles 27-30 to direct the operator as to which chicken pieces are to be placed in one compartment 12a, 12b. This direction allows the operator to focus on extracting only two particular types of chicken pieces (breasts/wings or legs/thighs) without having to differentiate between all four types of chicken pieces during the initial sorting process. Although sorting between two groups of pieces versus four types of pieces may seem to be a minor alteration, in actual practice limiting the sorting in this manner leads to significant time savings in the marination of chicken pieces. The time savings is still realized even though there is a sorting step when the fully marinated chicken pieces are removed from the two compartments in the drum. Again, selecting between only two types of chicken pieces speeds the sorting process.

The present disclosure should be considered as illustrative and not restrictive in character. It is understood that only certain embodiments have been presented and that all changes, modifications and further applications that come within the spirit of the disclosure are desired to be protected.

What is claimed is:

1. A marinator apparatus comprising:
   a fluid-tight hollow drum, elongated along a longitudinal axis and including opposing top and bottom walls that are planar, a shell between said top and bottom walls that is circular, and opposite end walls;
   a top opening defined in said top wall having a top lid configured to sealingly close said top opening, said top opening sized to permit introduction of a food item to be treated within the drum;
   a bottom opening defined in said bottom wall having a bottom lid configured to sealingly close said bottom opening, said bottom opening sized to permit introduction of a food item to be treated within the drum;
   an interior baffle fixed inside said hollow drum between said top and bottom walls to define a top compartment accessible only through said top opening and an opposite bottom compartment accessible only through said bottom opening;
   a support axle fixed to and projecting from one of said opposite end walls colinear with the longitudinal axis of the drum; and
   a drive axle fixed to and projecting from the other of said opposite end walls colinear with the longitudinal axis of the drum, said drive axle configured to be rotatably driven by a source of rotational power.

2. The marinator apparatus of claim 1, wherein said drive axle includes a driven gear configured to be driven by a powered drive gear.

3. The marinator apparatus of claim 1, wherein said interior baffle includes a plurality of openings communicating between said top compartment and said bottom compartment.

4. The marinator apparatus of claim 1, wherein said interior baffle is arranged within said drum closer to said bottom wall than to said top wall.

5. The marinator apparatus of claim 4, wherein said interior baffle is five (5) inches from said bottom wall and seven (7) inches from said top wall.

6. The marinator apparatus of claim 1, wherein said top wall, said bottom wall and said baffle are parallel to said longitudinal axis.

7. The marinator apparatus of claim 1, wherein said top wall and said bottom wall are parallel to said longitudinal axis and said baffle is angled relative to said longitudinal axis toward one end wall of the drum.

8. The marinator apparatus of claim 1, further comprising:
   a first manually graspable handle extending from said top wall adjacent one of said opposite end walls;
   a second manually graspable handle extending from said top wall adjacent the other of said opposite end walls;
   a third manually graspable handle extending from said bottom wall adjacent said one of said opposite end walls; and
   a fourth manually graspable handle extending from said bottom wall adjacent said other of said opposite end walls.

9. The marinator apparatus of claim 8, further comprising:
   a first label associated with said first handle on said top wall;
   a different second label associated with said second handle on said top wall;
   a different third label associated with said third handle on said bottom wall; and
   a different fourth label associated with said fourth handle on said bottom wall,
   wherein each of the first, second, third and fourth labels identifies a different food item to be processed within said drum.

10. The marinator apparatus of claim 9, wherein the first, second, third and fourth labels include "BREASTS", "WINGS", "LEGS" and "THIGHS" in which the food items are parts of a whole chicken.

11. The marinator apparatus of claim 8, further comprising:
    a support block defining a channel for receiving said support axle to permit rotation of said support axle relative to said support block; and
    an L-shaped rod having a base pivotably supported in a bore defined in said block and including a leg extending generally perpendicularly from said base, said L-shaped rod configured so that said leg can be pivoted into one of said first, second, third and fourth handles of said drum to prevent rotation of said drum about said longitudinal axis.

12. The marinator apparatus of claim 1, further comprising a support block defining a channel for receiving said support axle to permit rotation of said support axle relative to said support block.

13. The marinator apparatus of claim 12, wherein:
    said support axle defines a notch; and
    said support block includes a pin projecting into said channel and arranged to engage said notch to prevent rotation of said support axle.

14. The marinator apparatus of claim 13, wherein said pin is spring-biased into engagement with said notch to prevent rotation of said support axle in a first rotational direction and deflectable out of engagement with said notch upon rotation of said support axle in a second rotational direction opposite said first rotational direction.

15. The marinator apparatus of claim 12, wherein said support block is formed of a low-friction material.

* * * * *